(12) United States Patent
Cannillo et al.

(10) Patent No.: US 11,626,800 B2
(45) Date of Patent: *Apr. 11, 2023

(54) HYBRID DC-DC POWER CONVERTER WITH SMALL VOLTAGE CONVERSION RATIO

(71) Applicant: Dialog Semiconductor (UK) Limited, London (GB)

(72) Inventors: Francesco Cannillo, Munich (DE); Nicola Macri, Feldkirchen (DE)

(73) Assignee: Dialog Semiconductor (UK) Limited, London (GB)

( * ) Notice: Subject to any disclaimer, the term of this patent is extended or adjusted under 35 U.S.C. 154(b) by 58 days.

This patent is subject to a terminal disclaimer.

(21) Appl. No.: 17/308,271

(22) Filed: May 5, 2021

(65) Prior Publication Data

US 2021/0281179 A1    Sep. 9, 2021

Related U.S. Application Data

(63) Continuation of application No. 16/430,772, filed on Jun. 4, 2019, now Pat. No. 11,005,371.

(30) Foreign Application Priority Data

May 3, 2019 (DE) .......................... 102019206421.3

(51) Int. Cl.
*H02M 3/158* (2006.01)
*H02M 1/14* (2006.01)
*H02M 1/00* (2006.01)

(52) U.S. Cl.
CPC .......... *H02M 3/1584* (2013.01); *H02M 1/14* (2013.01); *H02M 1/007* (2021.05); *H02M 1/009* (2021.05); *H02M 3/158* (2013.01); *H02M 3/1586* (2021.05)

(58) Field of Classification Search
CPC ...... H02M 1/14; H02M 1/009; H02M 1/0043; H02M 1/0095; H02M 3/1584;
(Continued)

(56) References Cited

U.S. PATENT DOCUMENTS 8,619,445 B1    12/2013  Low et al.
8,737,093 B1     5/2014  Baker
(Continued)

OTHER PUBLICATIONS

U.S. Notice of Allowance, U.S. Appl. No. 16/430,772, Applicant: Cannillo et al., dated Jan. 12, 2021, 9 pages.
(Continued)

*Primary Examiner* — Thienvu V Tran
*Assistant Examiner* — Shahzeb K Ahmad
(74) *Attorney, Agent, or Firm* — Saile Ackerman LLC; Stephen B. Ackerman (57) ABSTRACT

A power converter and method to provide a small conversion ratio between an input and an output voltage. The power converter has an inductor coupled to the input port of the power converter. The power converter has a first stage with an input node; a first switch; a second switch; a third switch coupled to the second switch of the first stage and to a reference potential; and a flying capacitor coupled to the input node. The power converter also has a second stage with an input node; a first switch coupled to the input node of the second stage and to the output port of the power converter; a second switch coupled to the input node of the first stage; a third switch coupled to the second switch of the second stage and to the reference potential; and a flying capacitor coupled to the inductor.

8 Claims, 9 Drawing Sheets (58) Field of Classification Search
CPC .... H02M 3/1582; H02M 3/158; H02M 3/156; H02M 3/07; H02M 3/073
See application file for complete search history.

(56) References Cited

U.S. PATENT DOCUMENTS

| | | | |
|---|---|---|---|
| 10,075,080 B1 | 9/2018 | Scoones | |
| 11,005,371 B2 | 5/2021 | Cannillo et al. | |
| 2007/0091655 A1 | 4/2007 | Oyama | |
| 2010/0156368 A1 | 6/2010 | Huynh et al. | |
| 2013/0234513 A1 | 9/2013 | Bayer | |
| 2014/0184189 A1* | 7/2014 | Salem | H02M 3/158 323/299 |
| 2015/0280553 A1 | 10/2015 | Giuliano et al. | |
| 2017/0201177 A1* | 7/2017 | Kesarwani | H02M 1/14 |
| 2017/0288533 A1* | 10/2017 | Sandusky | H02M 3/156 |
| 2018/0026518 A1* | 1/2018 | Liu | H02M 3/1584 323/312 |
| 2019/0348913 A1 | 11/2019 | Zhang | |
| 2020/0099302 A1* | 3/2020 | Webb | H02M 3/158 |
| 2020/0119635 A1* | 4/2020 | Rahimi | H02M 1/08 |

OTHER PUBLICATIONS

U.S. Office Action, U.S. Appl. No. 16/430,772, Applicant: Cannillo et al., dated Jul. 7, 2020, 28 pages.
German Office Action, File No. 10 2019 206 421.3, Applicant: Dialog Semiconductor (UK) Limited, dated Nov. 11, 2019, 7 pages.
"Comparison of a 12V, 10A, 3MHz Buck Converter and a Series Capacitor Buck Converter," by Pradeep S. Shenoy et al., 2015 IEEE Applied Power Electronics Conference and Exposition (APEC), Mar. 15-19, 2015, pp. 461-468.
IEEE Compel 2016, Jun. 2016, "Mixed-Signal Controlled Hybrid Converter Topologies," by Aleksandar Prodic, Laboratory for Power Management and Integrated SMPS, University of Toronto, Rogers ECE Department, pp. 1-71.
"Multi-Level Conversion: High Voltage Choppers and Voltage-Source Inverters," by T.A. Meynard et al., PESC '92 Record. 23rd Annual IEEE Power Electronics Specialists Conference, Jun. 29-Jul. 3, 1992, pp. 397-403.
"Single-Inductor-Multiple-Output Switching DC-DC Converters," by Dongwon Kwon et al., IEEE Transactions on Circuits and Systems-II: Express Briefs, vol. 56, No. 8, Aug. 2009, pp. 614-618.
"A Hybrid Inductor-Based Flying-Capacitor-Assisted Step-Up/Step-Down DC-DC Converter with 96.56% Efficiency," by Yong-Min Ju et al., 2017 IEEE International Solid-State Circuits Conference (ISSCC), Feb. 5-9, 2017, pp. 184-186.
"Hybrid Buck Converter Optimization and Comparison for Smart Phone Integrated Battery Charges," by Gabriel Gabian et al., 2018 IEEE Applied Power Electronics Conference and Exposition (APEC), Mar. 4-8, 2018, pp. 2148-2154.
"A Three-Level Single-Inductor Triple-Output Converter with an Adjustable Flying-Capacitor Technique for Low Output Ripple and Fast Transient Response," by Li-Cheng Chu et al., 2017 IEEE International Solid-State Circuits Conference (ISSCC), Feb. 5-9, 2017, pp. 186-188.
"On the Design of Single-Inductor Multiple-Output DC-DC Buck Converters," by Massimiliano Belloni et al., 2008 IEEE International Symposium on Circuits and Systems, May 18-21, 2008, pp. 3049-3051.
"A Simple Hybrid 3-Level Buck-Boost DC-DC Converter with Efficient PWM Regulation Scheme," by Abdullah Abdulslam et al., 2015 IEEE International Conference on Electronics, Circuits, and Systems (ICECS), Dec. 6-9, 2015, pp. 368-371.

* cited by examiner

Operating the power converter in a sequence of phases

FIG. 9

HYBRID DC-DC POWER CONVERTER WITH SMALL VOLTAGE CONVERSION RATIO

This application is a Continuation of U.S. application Ser. No. 16/430,772 which was filed on Jun. 4, 2019, assigned to a common assignee, and which is herein incorporated by reference in its entirety.

TECHNICAL FIELD

The present document relates to switched DC-DC power converters. In particular, the present document relates to an efficient power converter providing a relatively small voltage conversion ratio between the input voltage and the output voltage of the power converter.

BACKGROUND

Small size is a key requirement for DC-DC power converters which are used in high-end mobile applications, because a small size allows to integrate more features within the same volume. Recently, power conversion solutions based on hybrid topologies have been described, in order to reduce the size of inductors (notably the area and/or the thickness) or, equivalently, in order to increase the efficiency of the power converter solution for the same solution size. Hybrid converters employ flying capacitors to reduce the constraints on the coils which are often limited in thickness and physical dimensions.

In portable applications the battery voltage is typically down-converted with relatively small voltage conversion ratios $V_{OUT}/V_{IN}<0.5$ to supply different points of load. Hence, there is a need for power efficient power converters with a relatively small voltage conversion ratio (e.g. $V_{OUT}/V_{IN}<0.5$).

Figure 1:
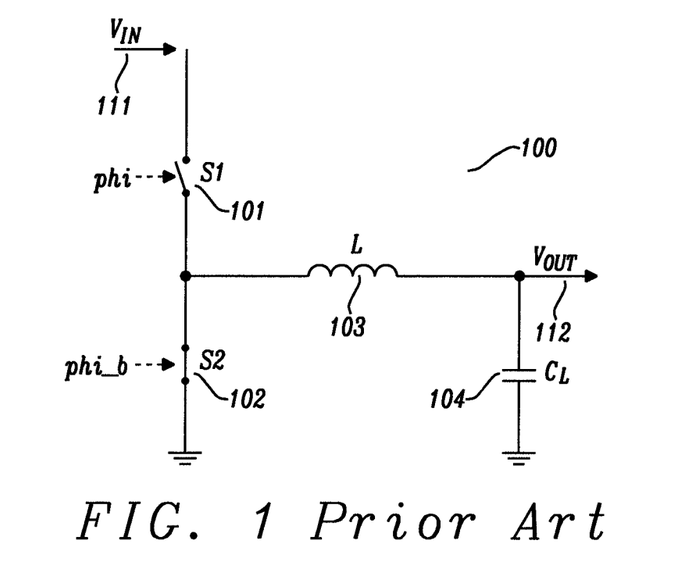

The efficiency of conventional synchronous DC-DC buck converters as shown in FIG. 1 decreases when the voltage applied across the inductor 103 increases, because of the relatively high inductor current ripple (for a given inductor). The converter 100 shown in FIG. 1 comprises a high side switch 101, a low side switch 102, an inductor 103 (i.e. a coil) and an output capacitor 104. The converter 100 is configured to convert an input voltage $V_{IN}$ at an input port 111 to an output voltage $V_{OUT}$ at an output port 112. For relatively small power conversion ratios $V_{OUT}/V_{IN}$, the voltage drop across the inductor 103 is relatively high, thereby increasing the inductor current ripple and thereby reducing the power efficiency.

SUMMARY

The present document addresses the technical problem of providing a compact DC-DC power converter which is configured to provide relatively small power conversion ratios (e.g. $V_{OUT}/V_{IN}<0.5$) in a power efficient manner.

According to an aspect, a power converter configured to convert an input voltage at an input port to an output voltage at an output port is described. The power converter comprises an inductor (directly) coupled to the input port of the power converter. Furthermore, the power converter comprises a first stage comprising: an input node; a first switch coupled to the input node of the first stage and to the output port of the power converter; a second switch coupled to the output port of the power converter; a third switch coupled to the second switch of the first stage and to a reference potential; and a flying capacitor coupled to the input node and to the intermediate node between the second switch and the third switch of the first stage. In addition, the power converter comprises a second stage comprising: an input node (coupled to the inductor); a first switch coupled to the input node of the second stage and to the output port of the power converter; a second switch (directly) coupled to the input node of the first stage; a third switch coupled to the second switch of the second stage and to the reference potential; and a flying capacitor coupled to the inductor and/or to the input node of the second stage and to the intermediate node between the second switch and the third switch of the second stage.

According to another aspect, a buck-boost power converter configured to convert an input voltage at an input port to an output voltage at an output port is described. The buck-boost power converter may be operated in a boost mode for providing a voltage conversion ratio greater than 1, and/or in a buck mode for providing a voltage conversion ratio smaller than 1.

The power converter comprises an inductor (directly) coupled to the input port of the power converter. Furthermore, the power converter comprises a first stage comprising: an input node which is (directly or indirectly) coupled to the inductor; a first switch coupled to the input node of the first stage and to the output port of the power converter; a second switch coupled to the output port of the power converter; a third switch coupled to the second switch of the first stage and to a reference potential; and a flying capacitor coupled to the input node of the first stage and to the intermediate node between the second switch and the third switch of the first stage. The power converter may comprise one or more additional stage (as outlined above). In addition, the power converter comprises a boost switch configured to couple the inductor (directly) to the reference potential.

According to a further aspect, a single input multiple output power (SIMO) converter configured to convert an input voltage at an input port to K output voltages at K different output ports, with K>1. The power converter comprises an inductor (directly) coupled to the input port of the power converter. Furthermore, the power converter comprises K stages for the K output ports, respectively. The $k^{th}$ stage, with k=1, ..., K, comprises: an input node (directly or indirectly) coupled to the inductor; a first switch coupled to the input node of the $k^{th}$ stage and to the $k^{th}$ output port of the power converter; a second switch coupled to the $k^{th}$ output port of the power converter; a third switch coupled to the second switch of the $k^{th}$ stage and to a reference potential; and a flying capacitor coupled to the input node of the $k^{th}$ stage and to the intermediate node between the second switch and the third switch of the $k^{th}$ stage.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or indirectly in some other manner (e.g. using a switch).

BRIEF DESCRIPTION OF THE DRAWINGS

The invention is explained below in an exemplary manner with reference to the accompanying drawings, wherein FIG. 1 show a circuit diagram of an example buck converter.

DESCRIPTION

As outlined above, the present document is directed at providing a small size power converter which is configured to provide a relatively small voltage conversion ratio in a power efficient manner. In this context, FIG. 2 illustrates an example hybrid power converter 100 comprising an inductor 103 and a flying capacitor 204.

The hybrid buck converter 100 shown in FIG. 1 improves the converter efficiency by using an inductor 103 (directly) at the converter input port 111. As a consequence, the average inductor current and the inductor current ripple are reduced compared to the conventional buck converter shown in FIG. 1. As a result of this, DC and AC inductor losses are reduced. Equivalently, for a given efficiency, the size of the required inductor 103 may be reduced.

Figure 2:
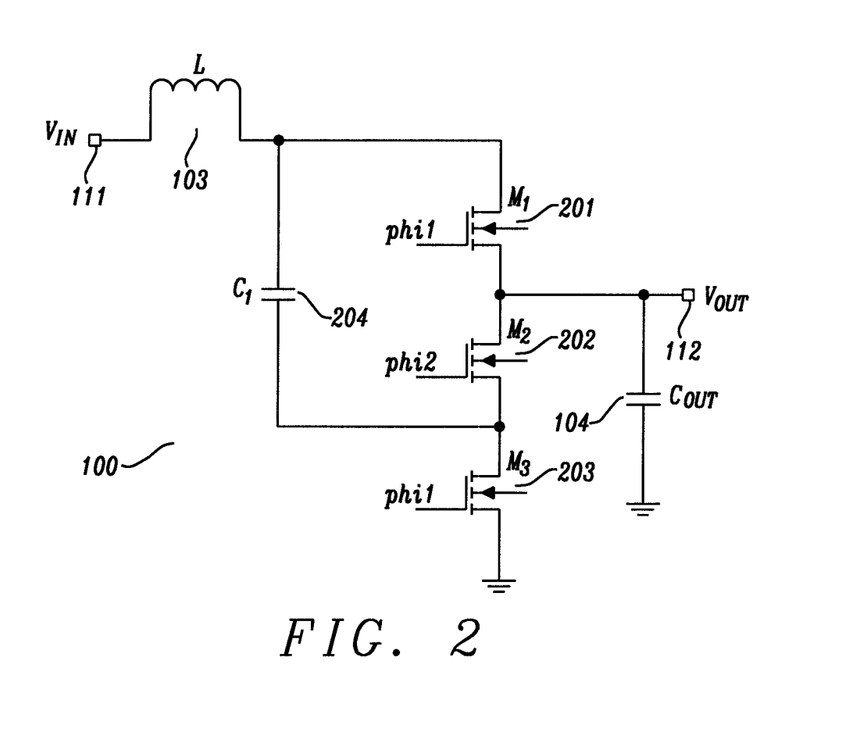
FIG. 2 shows a circuit diagram of an example hybrid buck converter.

This converter 100 shown in FIG. 2 operates in two phases. During the first phase, switches M1 201 and M3 203 are closed and the flying capacitor C1 204 is connected in parallel with the output capacitor $C_{OUT}$ 104. During the first phase the inductor 103 is magnetized. During the first phase the first gate control signal "phi1" may be high and the complementary second gate control signal "phi2" may be low. During the second phase, the second switch M2 202 connects the flying capacitor C1 204 in series with the inductor 103 between the input port 111 and the output port 112 (to de-magnetize the inductor 103). The first and second phases are repeated at a cycle rate (e.g. 100 kHz or more).

The conversion ratio of the converter 100 of FIG. 2 is $$\frac{V_{OUT}}{V_{IN}} = \frac{1}{2 - D}$$

wherein D is the duty cycle, i.e. the duration of the first phase compared to the total duration of a cycle (wherein the total duration may correspond to the sum of the durations of the first and the second phase). Hence, power converter 100 can provide output voltages $V_{OUT}$ from $V_{IN}$ to $0.5 V_{IN}$.

The switches 201, 202, 203 of the power converter 100 of FIG. 2 (which may be implemented as MOSFET devices) have a lower voltage rating compared to the switches 101, 102 of the conventional buck converter of FIG. 1. In particular, in steady-state operation, the maximum drain-source voltage is $V_{OUT}$ for the converter 100 of FIG. 2 compared to $V_{IN}$ for conventional buck converter in FIG. 1.

The topology of FIG. 2 is a hybrid topology, because it uses both an inductor 103 and a capacitor 204 for performing the power conversion task. Compared to a classical Multi-Level-Converter (MLC) solution, the topology of FIG. 2 does not require an active regulation of the flying capacitor 204, which is typically a challenging aspect of an MLC converter implementation.

Figure 3:
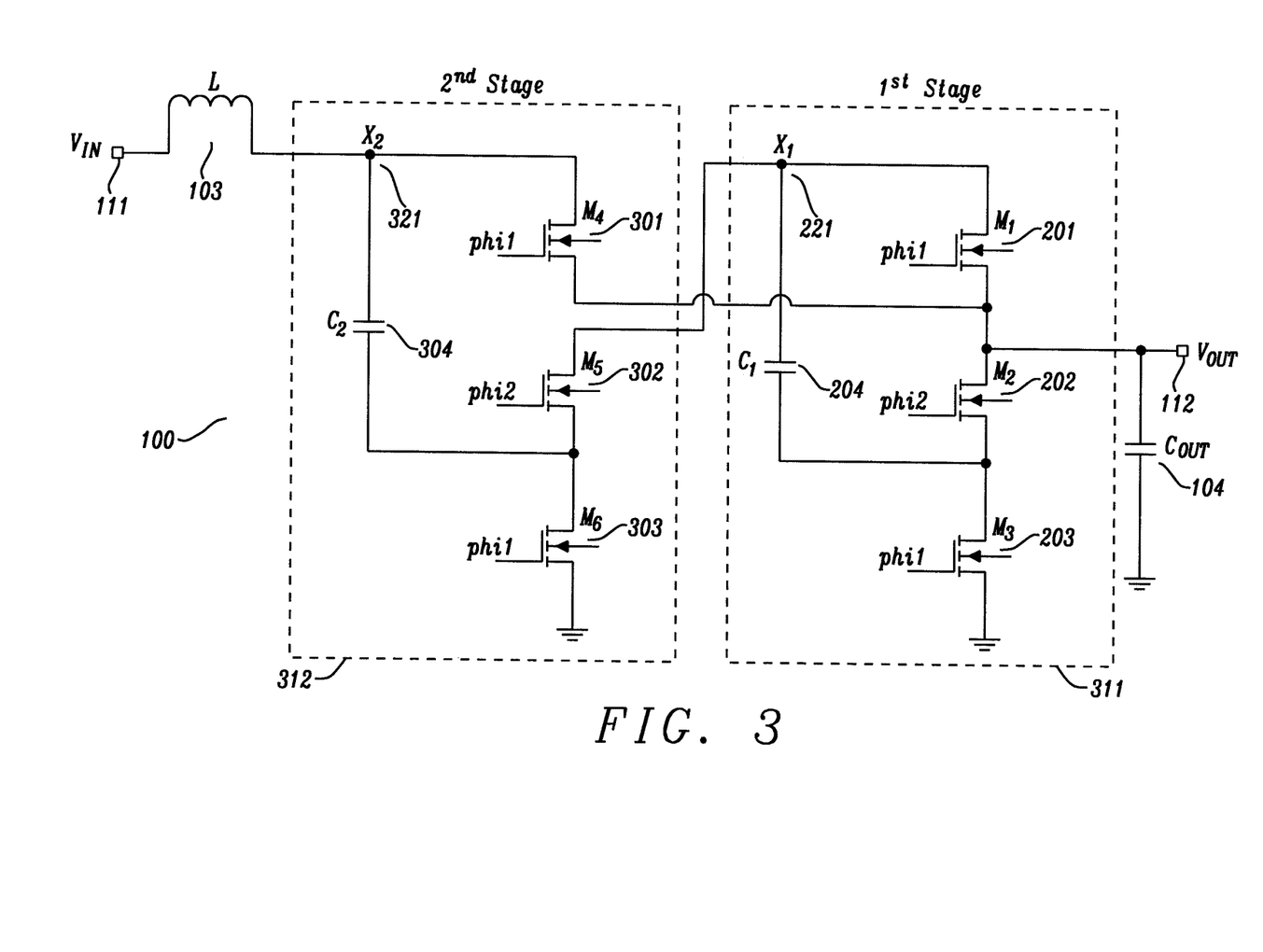
FIG. 3 shows a circuit diagram of an example multi-stage power converter.

FIG. 3 shows an example two-stage topology of a hybrid power converter 100. The converter 100 operates in two phases. During the first phase, the flying capacitors 204, 304 of both stages 311, 312 are connected to the output 112 of the converter 100 by closing the switches M4 301 and M6 303 of the second stage 312, and by closing the switches M1 201 and M3 203 of the first stage 311. The common inductor 103 is magnetized during the first phase. During the second phase, the two flying capacitors 204, 304 are placed in series with the inductor 103 by closing the switches M5 302 and M2 202 (and by opening the other switches 301, 303, 201, 203).

While the voltage rating of the switches M1 201, M2 202, M3 203 and M5 302 is $V_{OUT}$, the voltage rating of the switches M4 301 and M6 303 is $2V_{OUT}$. The conversion ratio of the multi-stage converter 100 of FIG. 3 can be calculated by applying the volt-second balance on the inductor 103 as $$\frac{V_{OUT}}{V_{IN}} = \frac{1}{3 - 2*D}.$$

Hence, the two-stage input inductor buck converter 100 of FIG. 3 is configured to provide output voltages $V_{OUT}$ in the range of $V_{IN}$ to $V_{IN}/3$.

Figure 4:
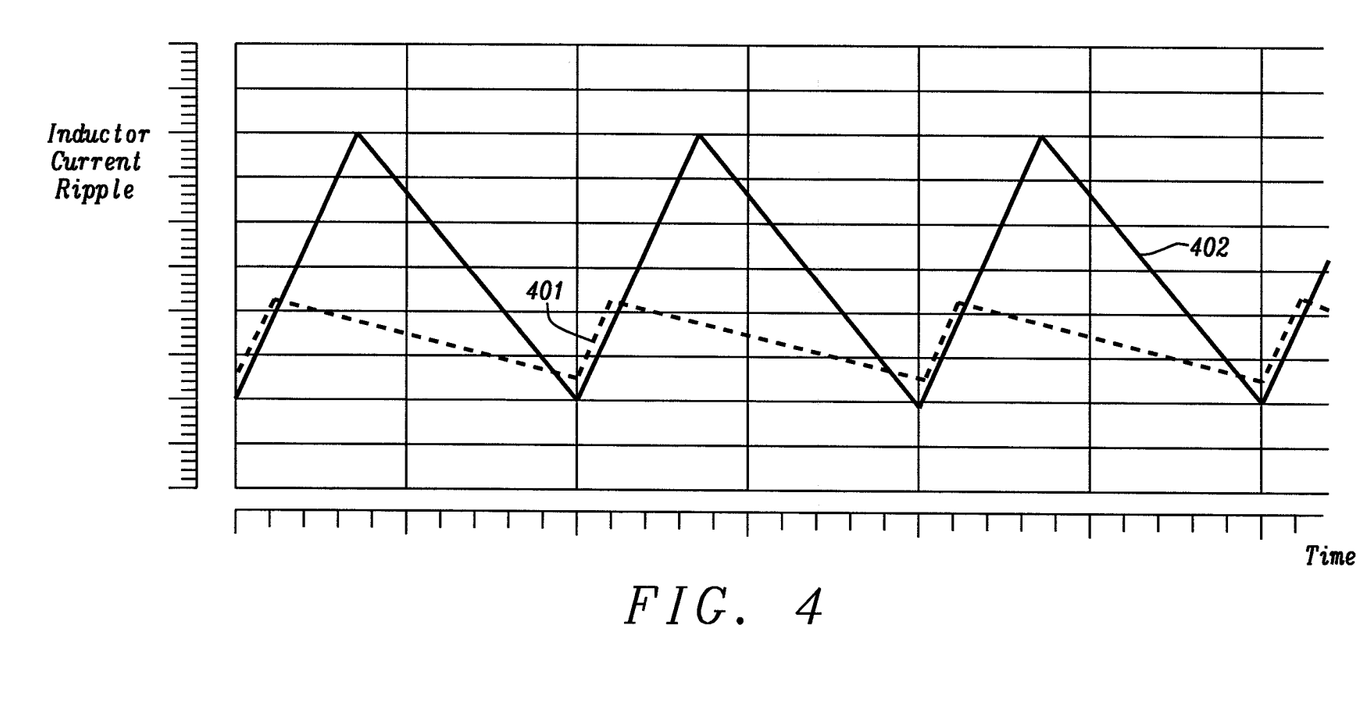
FIG. 4 shows an example inductor current of a multi-stage power converter.

The simulation results of FIG. 4 compare the two-stage input-inductor hybrid buck converter 100 of FIG. 3 to the conventional buck converter of FIG. 1 for the same input voltage $V_{IN}$ (5 V), the same switching frequency or cycle rate (1 MHz), the same inductance (470 nH) and the same load current (1 A). For a duty cycle D~0.1, the hybrid converter generates an output voltage of ~1.75 V. The inductor current ripple 401 of the input-inductor hybrid converter 100 is reduced by a factor of more than 5 compared to the inductor current ripple 402 of a conventional buck converter. Moreover, in the hybrid converter, the average inductor current is reduced by the $V_{IN}/V_{OUT}$ voltage conversion ratio because the inductor 103 is connected directly to the input port 111 of the converter 100.

Figure 5:
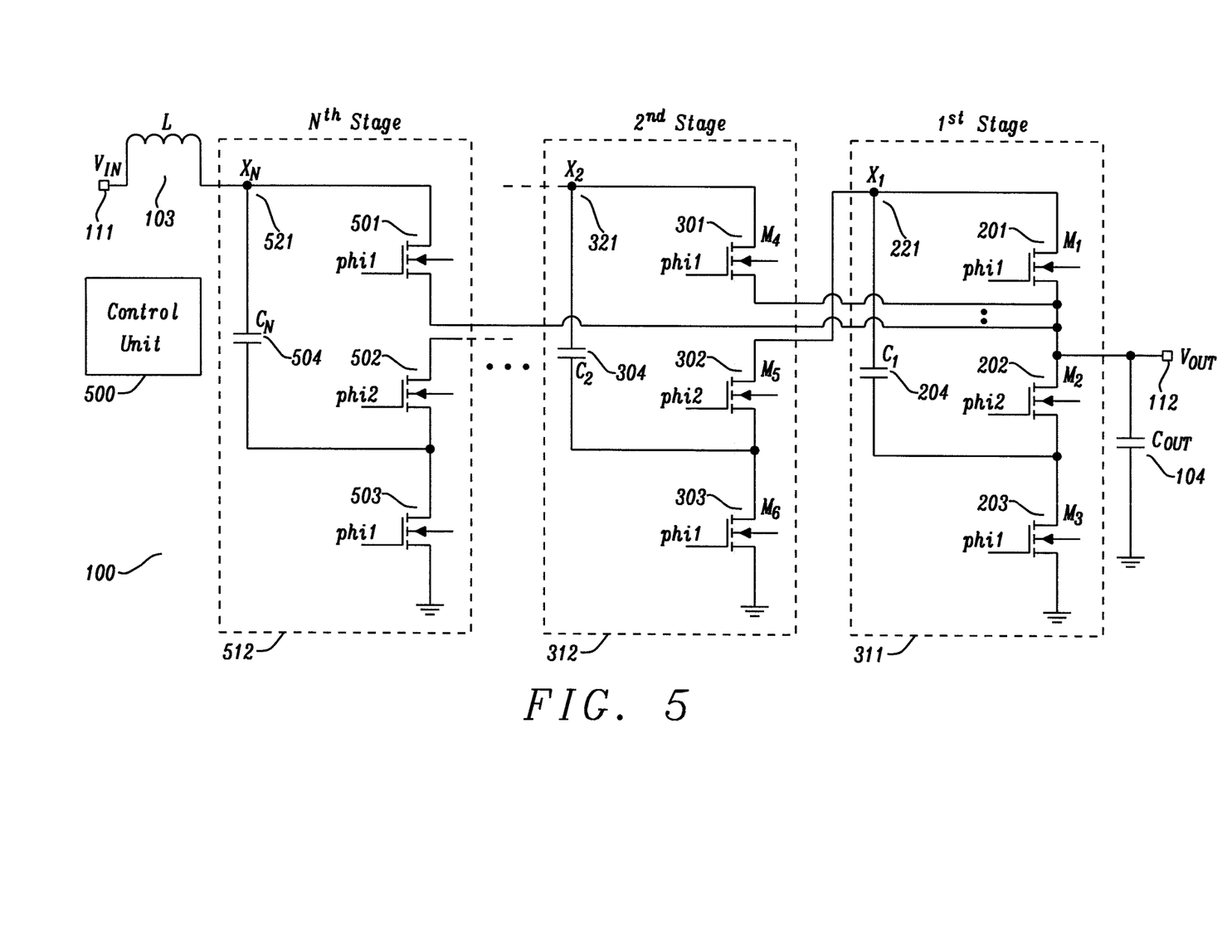
FIG. 5 shows a circuit diagram of another example multi-stage power converter.

The two-stage topology shown in FIG. 3 can be extended to N stages as shown in FIG. 5. Each stage 311, 312, 512 comprises a first switch 201, 301, 501, a second switch 202, 302, 502 and a third switch 203, 303, 503. Furthermore, each stage 311, 312, 512 comprises a flying capacitor 204, 304, 504. The switches may be implemented as metal-oxide semiconductor (MOS) field effect transistors (FETs).

The common inductor 103 (notably a first port of the inductor 103) of the multi-stage converter 100 is directly coupled to the input port 111 of the power converter 100. The first switch 501 of the $N^{th}$ stage 311 is configured to directly couple the inductor 103 (notably a second port of the inductor 103) to the output port 112, or to decouple the inductor 103 (notably the second port of the inductor 103) from the output port 112. The flying capacitor 504 of the $N^{th}$ stage 512 is arranged directly between the second port of the inductor 103 and the third switch 503 of the $N^{th}$ stage 512, notably to the intermediate point between the second switch 502 and the third switch 503 of the $N^{th}$ stage 311.

In particular, only the $N^{th}$ stage may be directly connected to the inductor 103. In a stage n (n≠N) the top (i.e. the first) switch 301 may connect between the input node $X_n$ 321 of the stage n and the output port 112. For example, in stage n=2 (see FIG. 5), switch M4 301 connects between node $X_2$ 321 and the output port 112. The input nodes 221, 321, 521 of the different stages 311, 312, 512 are different, i.e. node $X_1 \neq$ node $X_2 \neq \ldots \neq$ node $X_N$. Starting from the $2^{nd}$ stage, the second switch 302, 502 of a stage n connects to the input node $X_{n-1}$ of stage n−1, respectively.

The third switch 203, 303, 503 of each stage 311, 312, 512 is configured to directly couple the flying capacitor 204, 304, 504 of the respective stage 311, 312, 512 to the reference potential (notably to ground) of the converter 100, or to decouple the flying capacitor 204, 304, 504 of the respective stage 311, 312, 512 from the reference potential.

The second switch 202 of the first stage 311 is arranged between the first switch 201 and the third switch 203 of the first stage 311, and is configured to (directly) couple the first switch 201 with the third switch 203, or to decouple the first switch 201 from the third switch 203. Furthermore, the second switch 202 of the first stage 311 is configured to directly couple the flying capacitor 204 of the first stage 311 with the output port 112.

Each stage 311, 312, 512 comprises a respective input node 221, 321, 521. The input node 521 of the $N^{th}$ stage 512 is (directly) coupled to the second port of the inductor 103. Furthermore, the first switch 201, 301, 501 (notably a first port of the first switch 201, 301, 501) of each stage 311, 312, 512 is directly coupled to the input node 221, 321, 521 of the respective stage 311, 312, 512. In addition, the first switch 201, 301, 501 (notably a second port of the first switch 201, 301, 501) of each stage 311, 312, 512 is directly coupled to the output port 112 of the converter 100. Furthermore, the second switch 302, 502 of an additional stage 312, 512 "n" (with n>1) is directly coupled to the input node 221, 321 of the following stage 311, 312 "n−1".

For a multi-stage power converter 100 with N stages (as shown in FIG. 5), the voltage conversion ratio becomes:

$$\frac{V_{OUT}}{V_{IN}} = \frac{1}{N+1-N*D}$$

Therefore, an N-stage input-inductor hybrid converter 100 can provide output voltages $V_{OUT}$ in the range from $V_{IN}$ to $V_{IN}/N$.

Within an N-stage converter 100 the relationship between the peak-to-peak inductor current ripple and the duty cycle can be written as $$\Delta I \propto D \cdot \left(1 - \frac{1}{N+1-N*D}\right)$$

Figure 6A:
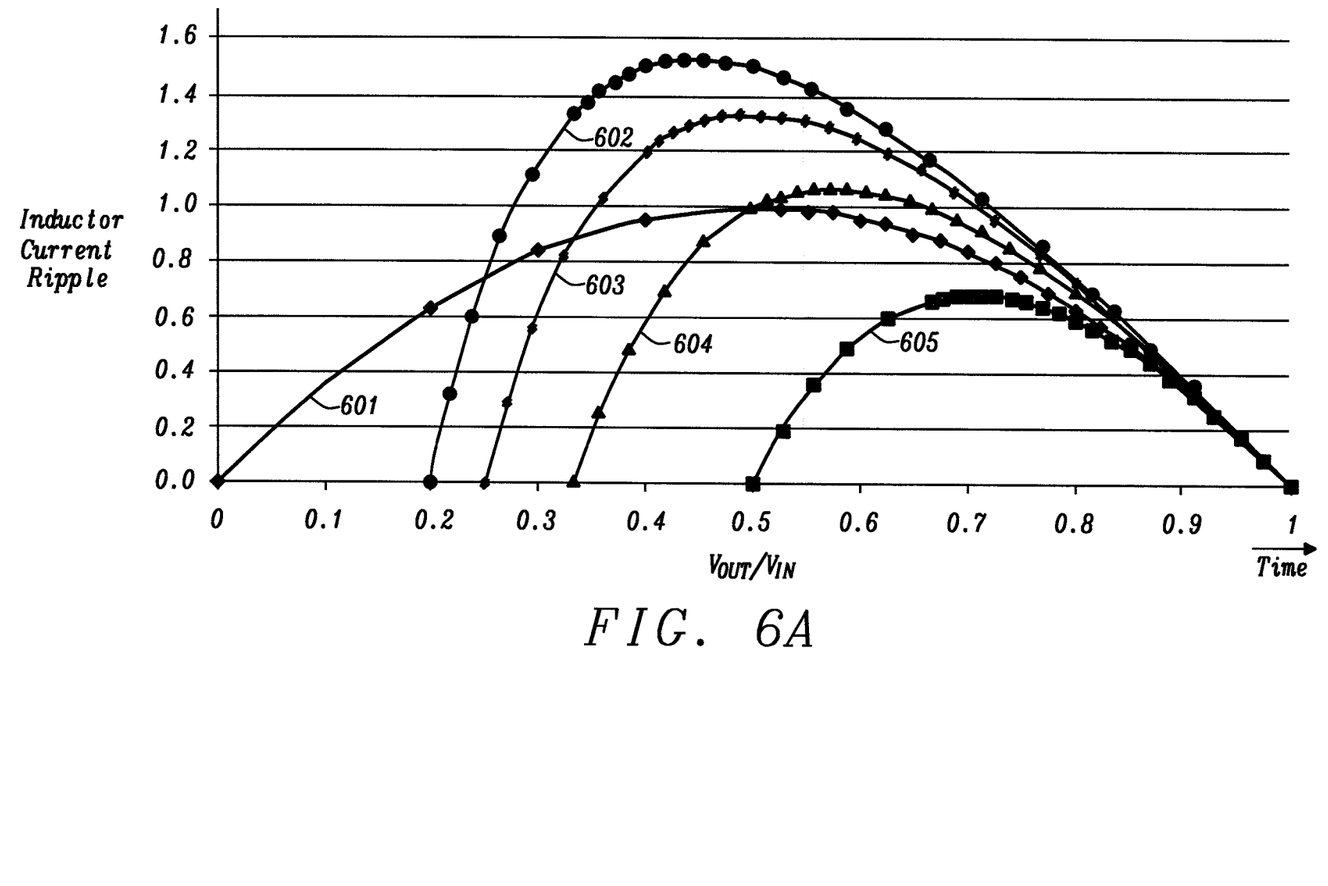
FIGS. 6A and 6B illustrate the peak-to-peak inductor current ripple as a function of the duty cycle of different types of power converters.

FIG. 6A shows the peak-to-peak inductor current ripple as function of the $V_{OUT}/V_{IN}$ ratio for the conventional buck converter (curve 601) and for the input-inductor hybrid converter 100 with a single stage (curve 605), with two stages (curve 604), with three stages (curve 603) and with four stages (curve 602). As can be seen, the current ripple of the hybrid converter 100 described in the present document may be smaller than that of a conventional buck (for all number N of stages 311, 312, 512), depending on the voltage conversion ratio.

Figure 6B:
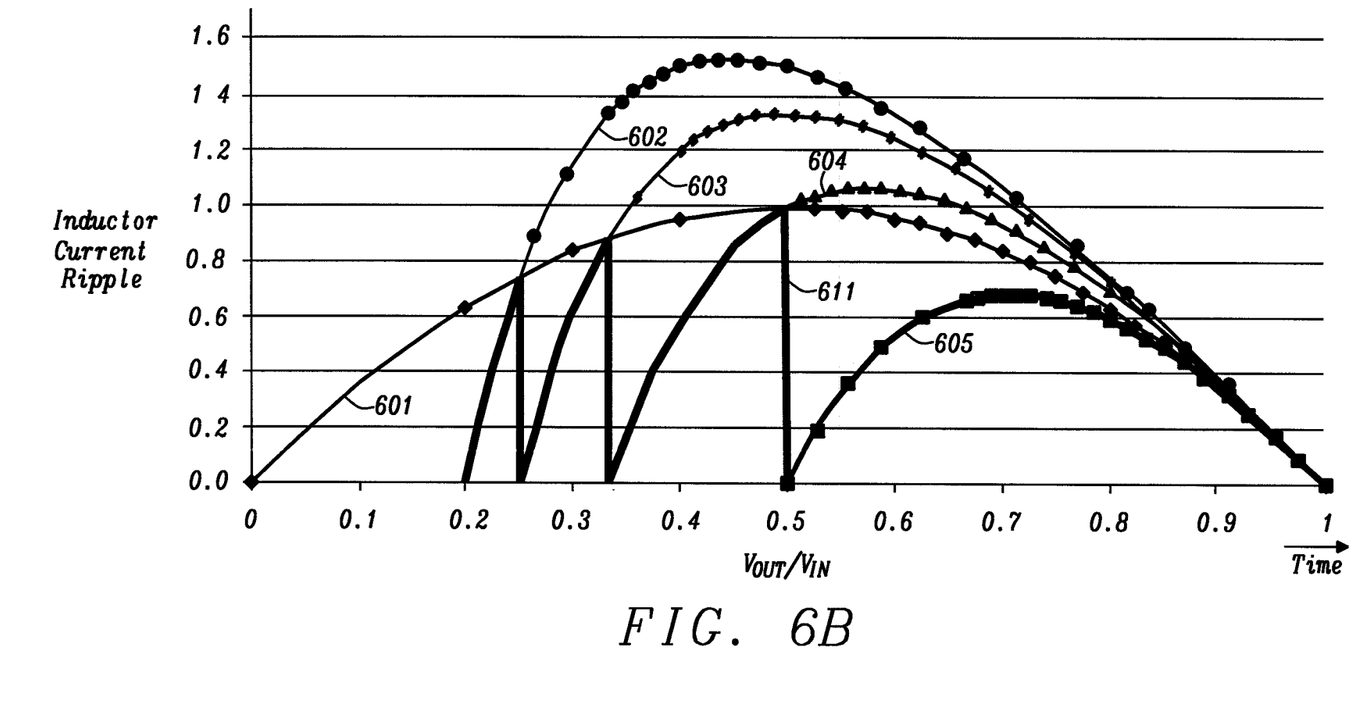

The hybrid converter 100 may be implemented in a reconfigurable manner. In particular, the hybrid converter 100 may be configured such that, depending on the required output voltage $V_{OUT}$, the converter 100 automatically changes the number of active stages 311, 312, 512, in order to improve the efficiency of the converter 100 by reducing the current ripple. This can be achieved by adopting the architecture of FIG. 5, as each stage 312, 512 can be activated or deactivated individually. FIG. 6B illustrates the inductor current ripple vs $V_{OUT}/V_{IN}$ curve 611 for a reconfigurable converter 100. Since the current ripple is zero for several values of $V_{OUT}/V_{IN}$, the converter 100 may be operated in a particularly efficient manner for these particular values of $V_{OUT}/V_{IN}$.

The number of active stages of a reconfigurable converter 100 is determined by the target $V_{OUT}/V_{IN}$ ratio. One or more stages 311, 312, 512 may be disabled starting from the $1^{st}$ stage. Disabling the $1^{st}$ stage 311 (or disabling the $n^{th}$ stage 512, with n=1, . . . , N) of FIG. 5 consists in closing permanently switches $M_1$ 201 and $M_3$ 203 (or the first switch 501 and the third switch 503) and opening the second switch $M_2$ 202 (or 502). As a consequence, the flying capacitor $C_1$ 204 (or $C_n$ 504 for the $n^{th}$ stage 512) is placed in parallel with the output capacitor $C_{OUT}$ 104 and a path to the output port 112 is provided during the de-magnetization phase for the remaining stages. Thus, the remaining converter has N−1 stages. When the disabled stage 311 needs to be re-enabled its corresponding flying capacitor 204 is already pre-charged to the output voltage $V_{OUT}$.

During the magnetization phase, conduction losses are due only to the first switch 501 of the $N^{th}$ stage 512, which is arranged in series with the inductor 103. The first switches 201, 301 of the different stages 311, 312 (1 to N−1) connect the flying capacitors $C_1, \ldots, C_{N-1}$ to the output port 112. The capacitor $C_N$ 504 of the $N^{th}$ stage 512 is also connected to the output port 112 by the switch 501 of the $N^{th}$ stage 512. During the de-magnetization phase, conduction losses are due to the series of the second switches 202, 302, 502 of the N stages 311, 312, 512. Hence, during the de-magnetization phase conduction losses are generated by N switches. Nevertheless, a power efficient operation of the converter 100 is enabled by the reduced conduction losses during the magnetization phase.

The voltage rating of the switches 501, 502, 503 in the $n^{th}$ (n≠1) stage 512 is $nV_{OUT}$ for the first switch 501 and the third switch 503 and $V_{OUT}$ for the second switch 502. The voltage rating for the first switch 501 can be lowered by connecting the first switch 501 between the input nodes $X_n$ and $X_{n-1}$ rather than between $X_n$ and the output port 112. However, this configuration introduces more conduction losses, because of the series connection of the first switches 201, 301, 501 of the stages 311, 312, 512. The voltage rating of all flying capacitors 204, 304, 504 is $V_{OUT}$ (compared to $V_{IN}/2$ in an MLC converter topology).

Figure 7:
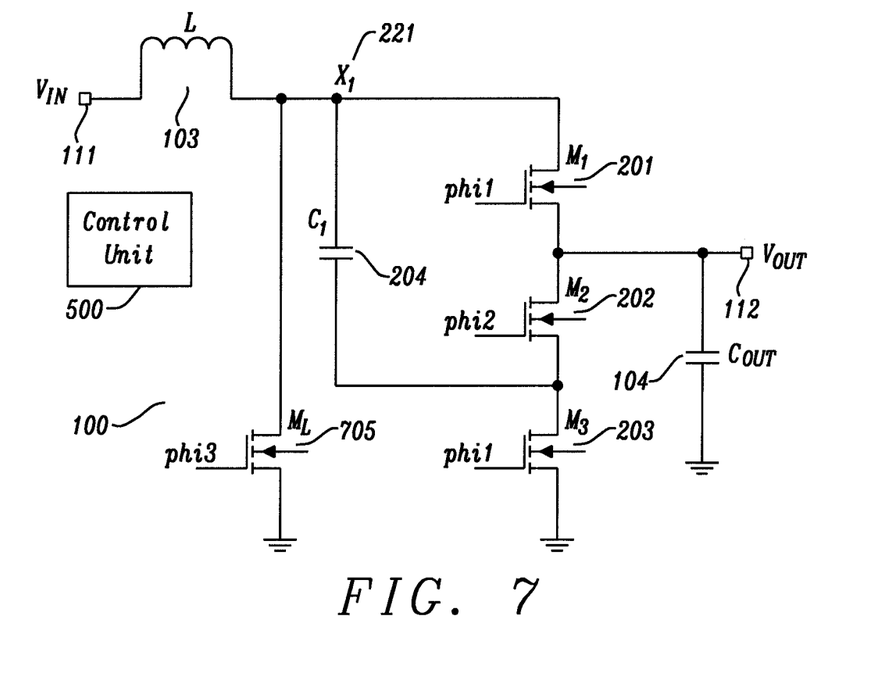
FIG. 7 shows a circuit diagram of an example buck-boost power converter.

The converter topology described in the present document may be extended to a buck-boost and/or to a SIMO (Single Input Multiple Output) topology. FIG. 7 shows an example buck-boost hybrid converter 100 comprising an additional boost switch 705 and an additional phase "phi3". The single-stage arrangement of FIG. 7 may be extended to a multi-stage arrangement (similar to FIG. 5).

The boost switch $M_L$ 705 introduces a magnetization phase phi3 for the coil L 103, followed by a de-magnetization phase via the first switch $M_1$ 201. Therefore, a buck-boost operation is achieved using an input coil 103. There is no theoretical limit to the output voltage $V_{OUT}$ achievable in boost operation. The first switch $M_1$ 201 may be implemented as a bulk switch, in order to change the orientation of the $M_1$ bulk diode connected between the input node $X_1$ 221 and the ports 111, 112, depending on buck or boost operation. If the technology does not allow for a bulk switch for the switch $M_1$, an additional switch with opposite bulk diode orientation can be placed in series with $M_1$ (i.e. switches with back-to-back diodes may be used). Compared to a conventional buck-boost converter, the topology of FIG. 7 comprises only a single switch in series between the input port 111 and the output port 112 of the power converter 100, therefore improving the efficiency in both buck and boost modes. In buck mode, the efficiency improvement is typically higher because of the current ripple reduction. For N>1 stages, the efficiency improves for a larger $V_{OUT}$ range.

Figure 8:
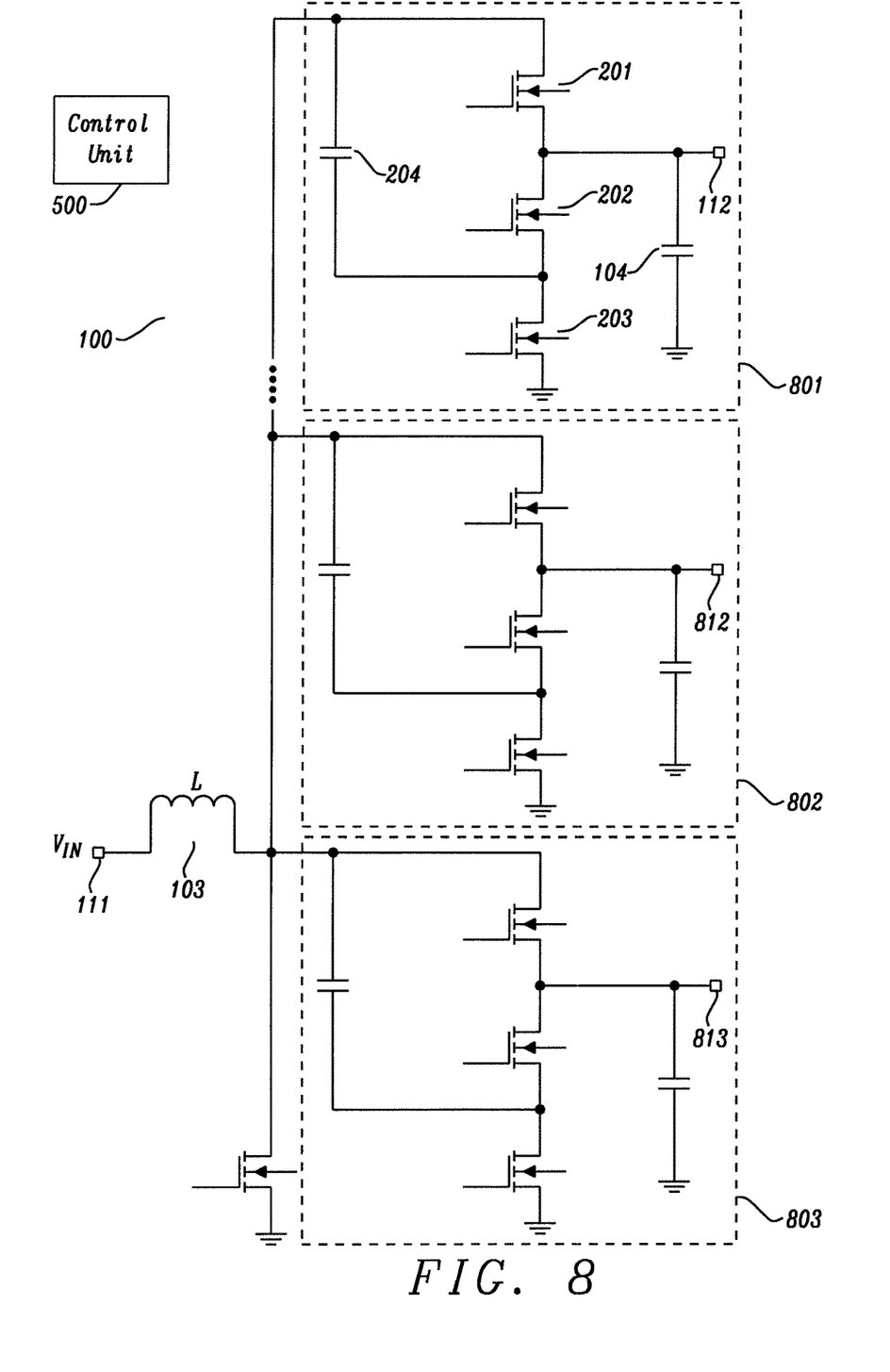
FIG. 8 shows an example SIMO power converter.

The buck-boost topology of FIG. 7 may be used to implement a Single Inductor Multiple Outputs (SIMO) buck-boost converter 100, as shown in FIG. 8 fork different outputs ports 112, 812, 813.

For each of the k stages 801, 802, 803, there is a single switch between the input port 111 and the corresponding output port 112 of the respective stage 801, 802, 803, thereby enabling an efficient SIMO operation. The input coil 103 of the topology facilitates the distribution of power to multiple output ports 112, 812, 813. Each of the stages 801, 802, 803 may comprise at least one converter stage comprising a first switch 201, a second switch 202, a third switch 203 and a flying capacitor 204 (as outlined in FIG. 8).

Moreover, each stage 801, 802, 803 can be implemented for boost-only operation by removing (i.e. by maintaining open) the second switch 202 and the third switch 203, thereby removing the flying capacitor 204 of the respective stage 801, 802, 803. Furthermore, each stage 801, 802, 803 may make use of the multi-stage topology shown in FIG. 5.

Hybrid SIMO buck-boost converters 100 as shown in FIG. 8 may be used to generate 3V rails (e.g. for MCUs (Microcontroller Units), sensors supply, flash memory supply, etc.) as well as higher voltage rails (e.g. for small motors, display supplies, etc) from a single cell Li-Ion battery. An N-stage hybrid SIMO topology enables the generation of additional low-voltage rails like 1.8V I/O or sensors supplies. Hence, various different solutions are enabled with a single small geometry coil 103 and relatively small and cost effective capacitors 204, 304, 504.

Hence, the present document describes a (switched mode) power converter 100 which is configured to convert an input voltage $V_{IN}$ at an input port 111 to an output voltage $V_{OUT}$ at an output port 112. The power converter 100 comprises an inductor 103 (notably a single inductor) which is (directly) coupled to the input port 111 of the power converter 100.

Furthermore, the power converter 100 comprises a first stage 311 which comprises an input node 221, and a first switch 201 which is (directly) coupled to the input node 221 of the first stage 311 and which is (directly) coupled to the output port 112 of the power converter 100. In addition, the first stage 311 comprises a second switch 202 which is (directly) coupled to the output port 112 of the power converter 100. In addition, the first stage 311 comprises a third switch 203 which is (directly) coupled to the second switch 202 of the first stage 311 and which is (directly) coupled to the reference potential (notably to ground). Furthermore, the first stage 311 comprises a flying capacitor 204 which is (directly) coupled to the input node 221 of the first stage 311 and which is (directly) coupled to the intermediate node between the second switch 202 and the third switch 203 of the first stage 311.

In addition, the power converter 100 comprises a second stage 312 which comprises an input node 321 (which may be coupled directly or indirectly to the inductor 103). In addition, the second stage 312 comprises a first switch 301 which is (directly) coupled to the input node 321 of the second stage 312 and which is (directly) coupled to the output port 112 of the power converter 100. The second stage 312 further comprises a second switch 302 which is (directly) coupled to the input node 221 of the first stage 311, and a third switch 303 which is (directly) coupled to the second switch 302 of the second stage 312 and which is (directly) coupled to the reference potential. Furthermore, the second stage 312 comprises a flying capacitor 304 which is (directly or indirectly) coupled to the inductor 103 and which is (directly) coupled to the intermediate node between the second switch 302 and the third switch 303 of the second stage 312.

It should be noted that in the present document, a switch being coupled to two different components indicates that a first port of the switch (e.g. the source) is coupled to the first component and a second port of the switch (e.g. the drain) is coupled to the second component. The switches in the present document may be implemented as MOSFETs.

Hence, the first switch 201, 301 of a stage 311, 312 may be configured to couple or decouple the input node 221, 321 of the stage 311, 312 with or from the output port 112 of the power converter 100. The third switch 203, 303 of a stage 311, 312 may be configured to couple or decouple the flying capacitor 204, 304 of the stage 311, 312 with or from the reference potential. The second switch 202 of the first stage 311 is configured to couple or to decouple the intermediate node (or the flying capacitor 204) with or from the output port 112 of the power converter 100. On the other hand, the second switch 302 of the second stage 312 is configured to couple or to decouple the intermediate node (or the flying capacitor 304) with or from the input node 221 of the first stage 311.

The power converter 100 enables a power efficient generation of an output voltage $V_{OUT}$ from an input voltage $V_{IN}$ with a relatively small voltage conversation ratio (e.g. <0.5).

The power converter may comprise a control unit 500 which is configured to operate the first and second stage 311, 312 alternatingly and repeatedly in a first and a second phase. In the first phase, the first switches 201, 301 and the third switches 203, 303 of the first and second stage 311, 312 may be closed, and the second switches 202, 302 of the first and second stage 311, 312 may be open. Furthermore, in the second phase, the first switches 201, 301 and the third switches 203, 303 of the first and second stage 311, 312 may be open, and the second switches 202, 302 of the first and second stage 311, 312 may be closed. By doing this, a stable power conversion may be achieved.

The control unit 500 may be configured to set the duration of the first phase relative to the duration of the second phase, in order to set a particular voltage conversion ratio between the output voltage $V_{OUT}$ and the input voltage $V_{IN}$ of the power converter 100. Furthermore, the control unit 500 may be configured to repeat the first and the second phase at a particular (notably constant) cycle rate. By doing this, a stable power conversion may be achieved.

The power converter 100 may comprise N stages 311, 312, 512 enumerated as stages n=1, . . . , N, with N>2. The first stage 311 may be the stage 311 with n=1, and the second stage 312 may be the stage 312 with n=2. The $n^{th}$ stage 512 (for n≠1 may comprise an input node 521 (which may be (directly) coupled to the second switch 502 of the $(n+1)^{th}$ stage 512 (for n<N) or directly coupled to the inductor 103 (for n=N)). In addition, the $n^{th}$ stage 512 may comprise a first switch 501 (directly) coupled to the input node 521 of the $n^{th}$ stage 512 and (directly) coupled to the output port 112 of the power converter 100. Furthermore, the n$^{th}$ stage 512 may comprise a second switch 502 which is (directly) coupled to the input node 321 of the (n−1)$^{th}$ stage 312, and a third switch 503 which is (directly) coupled to the second switch 502 of the n$^{th}$ stage 512 and (directly) coupled to the reference potential. In addition, the n$^{th}$ stage 512 may comprise a flying capacitor 504 which is (directly) coupled to the second switch 502 of the (n+1)$^{th}$ stage 512 (in case of n<N) or (directly) coupled to the inductor 103 (in case of n=N) and which is (directly) coupled to the intermediate node between the second switch 502 and the third switch 503 of the n$^{th}$ stage 512. Hence, a multi-stage power converter 100 may be provided, wherein an increasing number of stages 311, 312, 512 enables an efficient operation for decreasing voltage conversion ratios $V_{OUT}/V_{IN}$.

The control unit 500 may be configured to determine a target voltage conversion ratio between the output voltage $V_{OUT}$ and the input voltage $V_{IN}$. Furthermore, the control unit 500 may be configured to deactivate or activate the first stage 311 in dependence of the target voltage conversion ratio. In particular, the control unit 500 may be configured to increase the number of active stages 311, 312, 512 with decreasing target voltage conversion ratio $V_{OUT}/V_{IN}$.

By way of example, a multi-stage power converter 100 may be provided with N stages 311, 312, 512. For a relatively high target voltage conversion ratio $V_{OUT}/V_{IN}$ (e.g. between 0.5 and 1), only a single phase 512 may be used. The number of stages 311, 312, 512 may be increased with decreasing value of the target voltage conversion ratio $V_{OUT}/V_{IN}$ (e.g. as illustrated in FIG. 6B).

The stages 311, 312, 512 may be deactivated starting with stage n=1, and may be deactivated according to increasing values of n. The control unit 500 may be configured to deactivate a particular stage 311 by maintaining permanently closed the first switch 201 and the third switch 203 of the particular stage 311 and by maintaining permanently open the second switch 202 of the particular stage 311. By adapting the number of active stages 311, 312, 512 of a multi-stage power converter 100, the power efficiency of the power converter 100 may be increased.

The control unit 500 may be configured to determine the number of active stages 311, 312, 512 for the target voltage conversion ratio using a look-up table. The look-up table may indicate the most power efficient number of active stages 311, 312, 512 for a particular target voltage conversion ratio. The power converter 100 may then be operated in a particular efficient manner with the determined number of active stages 311, 312, 512.

Furthermore, a buck-boost power converter 100 configured to convert an input voltage $V_{IN}$ at an input port 111 to an output voltage $V_{OUT}$ at an output port 112 is described. The buck-boost converter 100 may also be a multi-stage converter 100 as described in the present document. In other words, the multi-stage converter 100 described in the present document may also be enabled for boost operation (notably by adding a (single) boost switch 705).

The power converter 100 comprises an inductor 103 which is (directly) coupled to the input port 111 of the power converter 100. Furthermore, the power converter 100 comprises a first stage 311 comprising an input node 221 which is (directly or indirectly) coupled to the inductor 103. In addition, the first stage 311 may comprise a first switch 201 which is (directly) coupled to the input node 221 of the first stage 311 and which is (directly) coupled to the output port 112 of the power converter 100. In addition, the power converter 100 may comprise a second switch 202 which is (directly) coupled to the output port 112 of the power converter 100, and a third switch 203 which is (directly) coupled to the second switch 202 of the first stage 311 and which is (directly) coupled to the reference potential. In addition, the first stage 311 comprises a flying capacitor 204 which is (directly) coupled to the input node 221 of the first stage 311 and which is (directly) coupled to the intermediate node between the second switch 202 and the third switch 203 of the first stage 311.

The buck-boost power converter 100 may comprise further stages (312, 512) as described in the present document.

In addition, the power converter 100 comprises a boost switch 705 which is configured to (directly) couple the inductor 103 to the reference potential. In particular, the boost switch 705 may be arranged (directly) between the inductor 103 and the reference potential, such that by closing the boost switch 705 the inductor 103 may be coupled directly with the reference potential. By providing a (single) boost switch 705, a boost mode may be implemented in an efficient manner.

The power converter 100 may comprise a control unit 500 which is configured to operate the first stage 311 (and possible additional one or more stages 312, 512) and the boost switch 705 repeatedly according to a first sequence of phases for a buck mode and/or according to a second sequence of phases for a boost mode.

Within the first sequence of phases the boost switch 705 may be maintained open. The first sequence of phases may comprise a first phase, during which the first switch 201 and the third switch 203 of the first stage 311 are closed, and the second switch 202 of the first stage 311 is open; and a second phase, during which the first switch 201 and the third switch 203 of the first stage 311 are open, and the second switch 202 of the first stage 311 is closed. As a result of this, a power efficient buck mode is enabled.

The second sequence of phases may comprise a first phase, during which the boost switch 705 is closed (for magnetization of the inductor 103) and during which the first, second and third switch 201, 202, 203 of the first stage 311 are open; and a second phase, during which the boost switch 705 is open and during which the first switch 201 of the first stage 311 is closed (for de-magnetization of the inductor 103), and during which the second and third switch 202, 203 of the first stage 311 are closed. As a result of this, a power efficient boost mode is enabled.

Furthermore, a single input multiple output (SIMO) power converter 100 configured to convert an input voltage $V_{IN}$ at an input port 111 to K (possibly different) output voltages $V_{OUT}$ at K different output ports 112, 812, 813, with K>1, is described.

The power converter 100 comprises an inductor 103 (notably a single inductor) which is (directly) coupled to the input port 111 of the power converter 100. Furthermore, the power converter 100 comprises K stages 801, 802, 803, wherein the k$^{th}$ stage 802, with k=1, . . . , K, comprises an input node 221 which is (directly) coupled to the inductor 103. Furthermore, the k$^{th}$ stage 802 comprises a first switch 201 which is (directly) coupled to the input node 221 of the k$^{th}$ stage 802 and which is (directly) coupled to the k$^{th}$ output port 112 of the power converter 100. In addition, the k$^{th}$ stage 802 comprises a second switch 202 which is (directly or indirectly) coupled to the k$^{th}$ output port 112 of the power converter 100, and a third switch 203 which is (directly) coupled to the second switch 202 of the k$^{th}$ stage 802 and to the reference potential. In addition, the k$^{th}$ stage 802 comprises a flying capacitor 204 which is (directly) coupled to the input node 221 of the k$^{th}$ stage 802 and which is (directly) coupled to the intermediate node between the second switch 202 and the third switch 203 of the $k^{th}$ stage 802.

The power converter 100 may comprise a control unit 500 which is configured to operate the K stages 801, 802, 803 in a time-multiplexed manner, in order to distribute power from the input port 111 to the K different output ports 112, 812, 813 of the power converter 100. Hence, a power efficient SIMO power converter 100 may be provided.

The power converter 100 may comprise a (notably a single) boost switch 705 which is configured to couple the inductor 103 to the reference potential, thereby enabling a boost mode for the power converter 100 (in addition to a buck mode).

At least one of the K stages 801, 802, 803 may comprise several sub-stages 311, 312, 512 (as outlined e.g. in the context of FIG. 5). In particular, a $k^{th}$ stage 802 may comprise a first sub-stage 311 and a second sub-stage 312 (which may be equivalent to the first and second stages 311, 312 described in the present document). In particular, the first sub-stage 311 may comprise an input node 221 and a first switch 201 which is (directly) coupled to the input node 221 of the first sub-stage 311 and which is (directly) coupled to the $k^{th}$ output port 112 of the power converter 100. In addition, the first sub-stage may comprise a second switch 202 which is (directly) coupled to the $k^{th}$ output port 112 of the power converter 100, as well as a third switch 203 which is (directly) coupled to the second switch 202 of the first sub-stage 311 and which is (directly) coupled to the reference potential. In addition, the first sub-stage 311 comprises a flying capacitor 204 coupled to the input node 221 of the first sub-stage 311 and coupled to an intermediate node between the second switch 202 and the third switch 203 of the first sub-stage 311.

The second sub-stage 312 may comprise: an input node 321; a first switch 301 coupled to the input node 321 of the second sub-stage 312 and to the $k^{th}$ output port 112 of the power converter 100; a second switch 302 coupled to the input node 221 of the first sub-stage 311; a third switch 303 coupled to the second switch 302 of the second sub-stage 312 and to the reference potential; and a flying capacitor 304 coupled to the inductor 103 and to the intermediate node between the second switch 302 and the third switch 303 of the second sub-stage 312.

Figure 9:
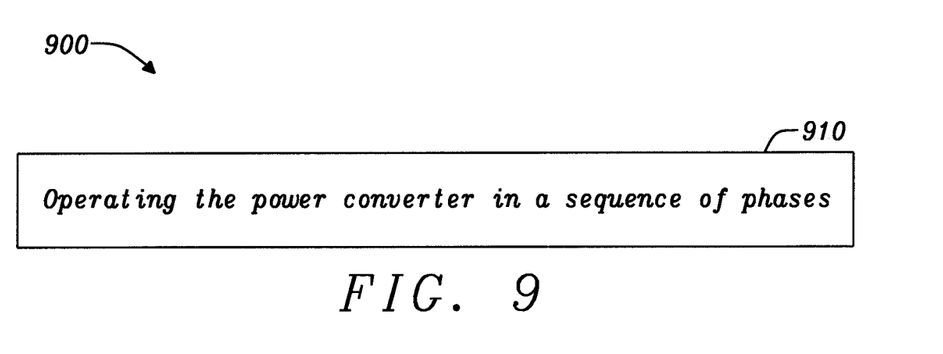
FIG. 9 shows a flow chart of an example method for operating a power converter.

FIG. 9 shows a flow chart of an example method 900 for operating a power converter 100 as described in the present document. The method 900 comprises operating 901 the power converter 100 in a repeated manner according to a sequence of phases.

The topology which is described in the present document achieves power conversion with relatively small input-to-output voltage conversion ratios $V_{OUT}/V_{IN}$ with increased efficiency and reduced area compared to a conventional (buck) converter.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert an input voltage at an input port to an output voltage at an output port; wherein the power converter comprises,
   an inductor coupled to the input port of the power converter;
   a first stage comprising
      an input node of the first stage;
      a first switch of the first stage coupled to the input node of the first stage and to the output port of the power converter;
      a second switch of the first stage coupled to the output port of the power converter;
      a third switch of the first stage coupled to the second switch of the first stage and to a reference potential; and
      a flying capacitor of the first stage coupled to the input node and to an intermediate node between the second switch and the third switch of the first stage;
   a second stage comprising
      an input node of the second stage;
      a first switch of the second stage coupled to the input node of the second stage and to the output port of the power converter;
      a second switch of the second stage coupled to the input node of the first stage;
      a third switch of the second stage coupled to the second switch of the second stage and to the reference potential; and
      a flying capacitor of the second stage coupled to the inductor and to an intermediate node between the second switch and the third switch of the second stage; and
   a control unit configured to
      determine a target voltage conversion ratio between the output voltage and the input voltage; and
      deactivate or activate the first stage in dependence of the target voltage conversion ratio,
   wherein the control unit is configured to deactivate a particular stage by
      maintaining permanently closed the first switch and the third switch of the particular stage; and
      maintaining permanently open the second switch of the particular stage.

2. The power converter of claim 1, wherein
   the control unit is configured to operate the first and second stage alternatingly and repeatedly in a first and a second phase;
   in the first phase, the first switches and the third switches of the first and second stage are closed, and the second switches of the first and second stage are open; and
   in the second phase, the first switches and the third switches of the first and second stage are open, and the second switches of the first and second stage are closed.

3. The power converter of claim 2, wherein the control unit is configured to set a duration of the first phase relative to a duration of the second phase, in order to set a voltage conversion ratio between the output voltage and the input voltage of the power converter.

4. The power converter of claim 2, wherein the control unit is configured to repeat the first and the second phase at a cycle rate.

5. The power converter of claim 1, wherein
   the power converter comprises N stages enumerated as n=1, . . . , N, with N>2;
   the first stage is the stage with n=1;
   the second stage is the stage with n=2;

the n$^{th}$ stage comprises
an input node;
a first switch coupled to the input node of the n$^{th}$ stage and to the output port of the power converter;
a second switch coupled to the input node of the (n−1)$^{th}$ stage;
a third switch coupled to the second switch of the n$^{th}$ stage and to the reference potential; and
a flying capacitor coupled to the second switch of the (n+1)$^{th}$ stage and to an intermediate node between the second switch and the third switch of the n$^{th}$ stage; and
the flying capacitor of the N$^{th}$ stage is directly coupled to the inductor.

6. The power converter of claim 1, wherein
the control unit is configured to increase the number of active stages as the target voltage conversion ratio decreases, or vice versa; and
the stages are deactivated starting with stage n=1, and according to increasing values of n.

7. The power converter of claim 6, wherein the control unit is configured to
determine the number of active stages for the target voltage conversion ratio using a look-up table; and
operates the power converter with the determined number of active stages.

8. A method for operating a power converter, wherein the power converter comprises
an inductor coupled to the input port of the power converter;
a first stage comprising an input node of the first stage; a first switch of the first stage coupled to the input node of the first stage and to an output port of the power converter; a second switch of the first stage coupled to the output port of the power converter; a third switch of the first stage coupled to the second switch of the first stage and to a reference potential; and a flying capacitor of the first stage coupled to the input node and to an intermediate node between the second switch and the third switch of the first stage; and
a second stage comprising an input node of the second stage; a first switch of the second stage coupled to the input node of the second stage and to the output port of the power converter; a second switch of the second stage coupled to the input node of the first stage; a third switch of the second stage coupled to the second switch of the second stage and to the reference potential; and a flying capacitor of the second stage coupled to the inductor and to an intermediate node between the second switch and the third switch of the second stage;
wherein the method comprises
operating the first and second stage alternatingly in a first and a second phase; wherein in the first phase, the first switches and the third switches of the first and second stage are closed, and the second switches of the first and second stage are open; and wherein in the second phase, the first switches and the third switches of the first and second stage are open, and the second switches of the first and second stage are closed;
determining a target voltage conversion ratio between the output voltage and the input voltage; and
deactivating or activating the first stage in dependence of the target voltage conversion ratio; and
wherein deactivating a particular stage comprises
maintaining permanently closed the first switch and the third switch of the particular stage; and
maintaining permanently open the second switch of the particular stage.

* * * * *